United States Patent Office.

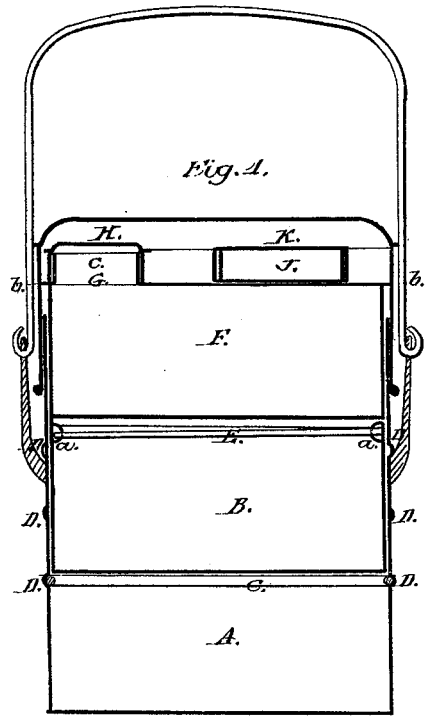
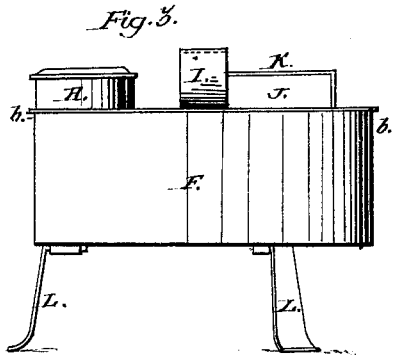
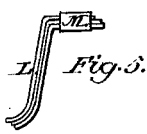
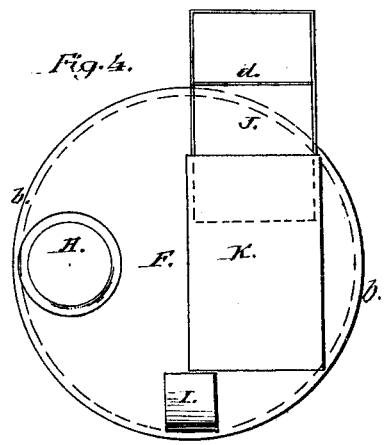
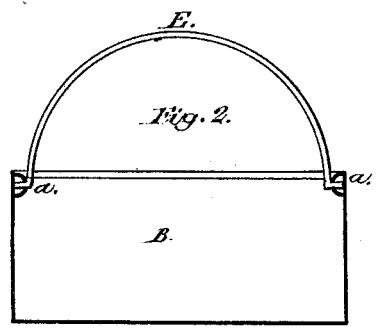

MORITZ SAULSON, OF TROY, NEW YORK.

*Letters Patent No. 91,168, dated June 8, 1869.*

IMPROVEMENT IN DINNER-PAIL.

The Schedule referred to in these Letters Patent and making part of the same.

*To all whom it may concern:*

Be it known that I, MORITZ SAULSON, of Troy, in the county of Rensselaer, and State of New York, have invented a new and improved Dinner-Pail, of which the following is a full and exact description, which will enable others skilled in the art to make and understand the same, reference being had to the accompanying drawings, making a part of this specification, in which—

Figure 1 is a vertical central section.

Figure 2 is a central section of the removable vessel B, as in fig. 1.

Figure 3 is a side, and

Figure 4, a top view of the canteen herein mentioned.

Figure 5 is a side view of the removable legs L, fig. 3, when clasped together.

Like letters refer to corresponding parts in the various figures.

The nature of my invention consists in the construction, arrangement, and combination of the various parts of a dinner-pail, as hereinafter more fully described.

A is the body of a dinner-pail, such as is commonly made of sheet-metal.

B is a removable vessel, which is supported in the body of the pail A, some distance from its bottom, by the outer edge of bottom of the vessel B, resting upon the circular-bent wire C, which wire C is made so as to spring outwardly, and into the grooves D.

By this means the vessel B forms a receptacle for the moist portion of the solid food, while that portion of the pail beneath the vessel B can be used for bread and other dry portions of the food.

The grooves D are formed on the internal circumference of the walls of the pail A, and arranged one above another, so that the space between the bottom of the pail A and the bottom of the vessel B can be increased or diminished at pleasure.

The vessel B is provided with a handle, or bail, E, the ends of which are attached to the inner and upper part of the vessel, at $a$, so that the handle may be turned down into the vessel, as shown in fig. 1.

F is a removable closed vessel, or canteen, the lower edge of which, when inserted into the pail, rests upon the upper edge of the vessel B.

The canteen F is also provided with a flange, $b$, the purpose of which is, that when the vessel B is removed from the pail, the canteen F will be supported in its place by the flange $b$, resting upon the upper edge of the pail A.

On one side of the upper surface of the canteen is a suitable perforation, G, provided with a short spout or raised rim, $c$, over which rim $c$ is fitted a cover, or cap, H, to prevent the liquid in the canteen from being easily spilled, or poured out by the tipping or swinging of the pail.

The canteen is also provided with a small ring, or handle, I, attached to its top, as shown in figs. 3 and 4, whereby the canteen can be used as a cup in drinking out of it.

On the upper surface of the canteen F is also a shallow dish, or vessel, J, which slides into a casing, K, which vessel can be divided or set off by partitions, $d$, so as to contain salt, pepper, mustard, &c.

In ordinary dinner-pails, the tea, coffee, or other fluid is put in the bottom of the pail A, and in warming the same, the vapor arising therefrom almost invariably moistening the food, thereby making it less palatable. Although this canteen is inserted in the pail for the purpose of obviating this difficulty, by taking it from the pail and heating it upon a stove, or similar means, still it often occurs that the mechanic or laborer is at work on the road-side or other place where he cannot thus handily warm his drink.

In order to meet this emergency, I provide the canteen F with removable legs, or supports, L, so that by pouring a small quantity of alcohol, or similar combustible fluid, into the salt-dish J, or cap H, and igniting the same under the canteen, thus supported, the drink can be readily warmed.

When the legs L are not needed, they may be taken from the canteen and kept together by the clasp, or band M, (see fig. 5,) and the same carried in the pocket or in the pail.

I am aware that inner vessels have been inserted in dinner-pails for the purpose of receiving certain portions of the food; but I do not know or believe that such vessels were ever provided with hinged bails, or handles, as B, herein described.

I am also aware of canteens being used in dinner-pails for the purpose of containing the liquid portion of the food; but I do not know that such canteens were ever provided with the flange $b$, for the purpose of supporting them in their place in the top of the pail, or provided with a ring, or handle, I, so that the canteen can be used in drinking out of it as an ordinary drinking-cup, or provided with supports, or legs, L, for the purpose herein set forth.

Having thus described my invention,

What I claim as new, and desire to secure by Letters Patent, is—

1. The combination, with the pail A, of the inner vessel B, provided with hinged bail E, as herein shown and described.

2. The combination, with the pail A, of the canteen F, provided with the flange $b$ and ring I, and removable standards or legs L, as herein shown and described, and for the purpose set forth.

Signed by me, this 1st day of May, 1869.

MORITZ SAULSON.

Witnesses:
PHILIP F. MILLER,
J. THORN GOODFELLOW.